United States Patent [19]
Jeffery

[11] Patent Number: 5,201,613
[45] Date of Patent: Apr. 13, 1993

[54] SINGLE POINT ADJUSTABLE CUTTING INSERT HOLDER

[76] Inventor: Samuel P. Jeffery, 11 Havazelet Hasharon St., Kfar Saba, POB 268, Hod Hasharon, Israel

[21] Appl. No.: 760,360

[22] Filed: Sep. 16, 1991

[51] Int. Cl.$^5$ ............................................... B23C 5/24
[52] U.S. Cl. ...................................... 407/36; 33/634; 33/636; 407/76; 407/83; 407/89
[58] Field of Search ..................... 407/36-39, 407/44, 45, 73-79, 81-84, 88-90, 104; 408/187, 188, 197; 33/633, 634, 636, 637

[56] References Cited

U.S. PATENT DOCUMENTS

| | | | |
|---|---|---|---|
| 2,495,368 | 1/1950 | Egli | 407/89 X |
| 3,341,923 | 9/1967 | Kelm | 407/104 |
| 3,911,542 | 10/1975 | Friedline et al. | 407/76 |
| 4,220,428 | 9/1980 | Suzuki | 407/89 X |
| 4,292,865 | 10/1981 | Liu et al. | 407/89 X |
| 4,389,144 | 6/1983 | Sipos | 407/89 X |

FOREIGN PATENT DOCUMENTS 426761 2/1975 U.S.S.R. ............................... 407/83

Primary Examiner—Steven C. Bishop
Attorney, Agent, or Firm—Edward Langer

[57] ABSTRACT

A single point adjustable triangular carbide cutting insert holder designed to clamp the cutting insert with maximum possibility for regrind or grinding for secondary operations. The insert holder is arranged for use in a milling machine and is collet-mounted by its shank. The jaw clamps can be removed for placement of the cutting insert between them, and are then refitted in the cavity where they are tightened by adjustment of a screw. As the screw is tightened, the jaw clamps are drawn further within the cavity, and are rigidly clamped against the cavity walls by frictional contact. When partially released, the jaws can be rotated within the cavity, enabling direct adjustment of the cutting insert rake and relief angle as desired. The cutting insert is seated between the jaw clamps on a seating cam mounted at an edge of the inner jaw face, such that the exposed portion of the cutting insert is a maximum. Thus, the exposed portion can be reground without removing the cutting insert from the holder, allowing for re-use of chipped, burnt and used up carbide cutting inserts. The ability to re-use "throw away" cutting inserts which have been reground makes the inventive insert holder economically attractive for use in many machining operations. The insert holder can also be used on a lathe, with the addition of a split sleeve on the shank. A feature of the invention is the provision of a gauge accessory to quickly check the cutting edge lead and clearance angle, especially useful with cutting insert regrinds.

12 Claims, 6 Drawing Sheets

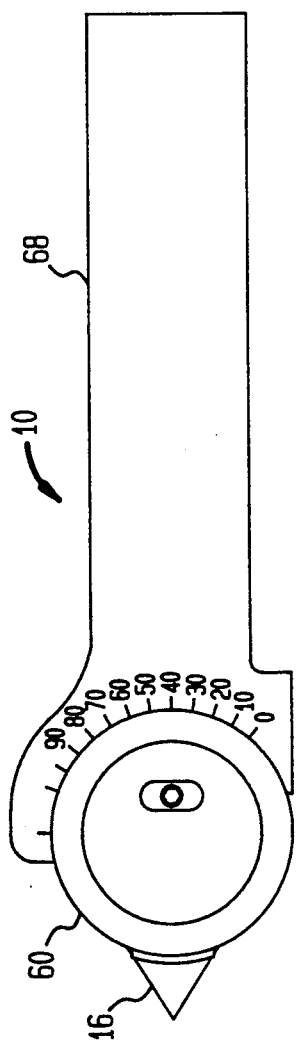
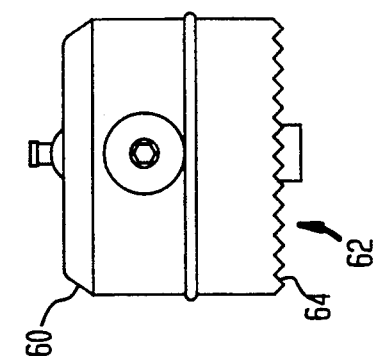
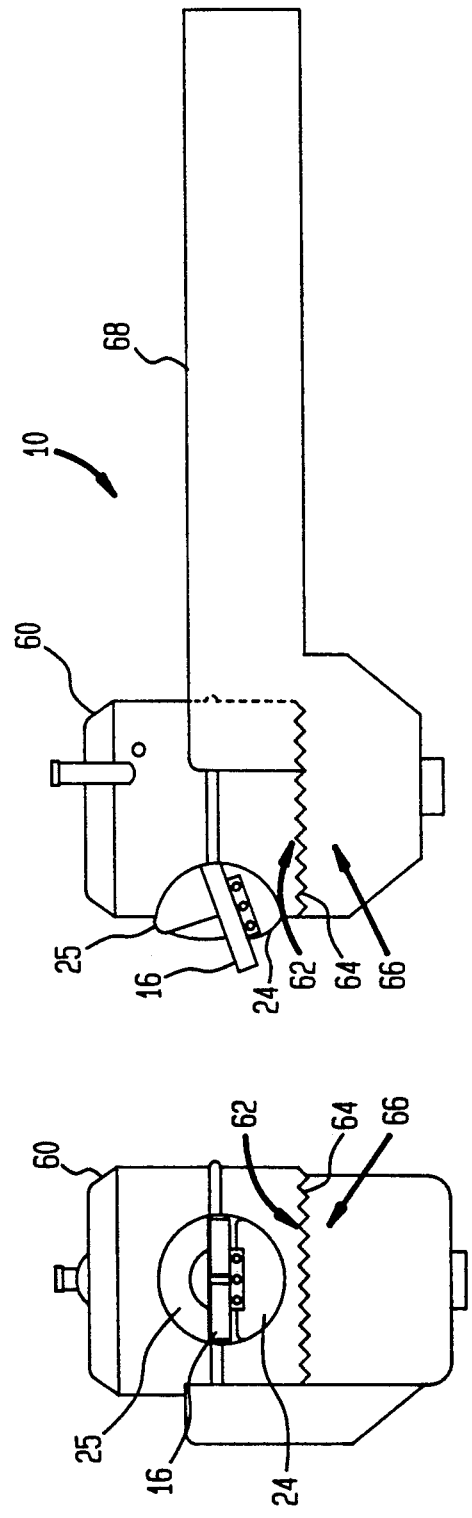
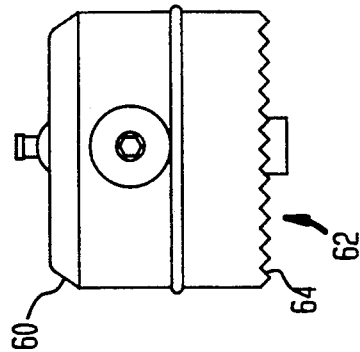

SINGLE POINT ADJUSTABLE CUTTING INSERT HOLDER

FIELD OF THE INVENTION

The present invention relates to cutting insert holders, and more particularly, to a cutting insert holder enabling re-use of expended cutting inserts in adjustable fashion.

BACKGROUND OF THE INVENTION

There are known cutting insert holders which are adjustable and designed to hold carbide cutting inserts used in machine tool metalworking operations. The carbide cutting inserts are disposed of after repeated use, and the cutting insert holder is used as a single purpose tool only. Examples of these type of cutting insert holders are disclosed in U.S. Pat. No. 4,850,757 to Stashko, and in U.S. Pat. Nos. 4,125,342 to Kress and 4,279,550 to Kress et al. These patents feature various designs for clamping the insert, although not allowing for direct adjustment of the insert orientation within the holder. The Stashko patent discloses an arrangement allowing for radial adjustment of the insert as needed in the metalworking process.

Typically, repeated use of the cutting insert working edge causes it to become worn down, to a point where its useful life is over, and the insert is then discarded. At this point, the edges of the insert are used up as they are either chipped, burnt or blunted. For example, with a triangular carbide cutting insert, there may be useful life remaining in the carbide material behind the "used up" edge, to the theoretical inner circle, on 3 or 6 edges (if the insert is turned over). However, existing cutting insert holders are generally not designed for multipurpose applications nor are they designed to exploit the remaining useful life since they do not provide the orientation required to hold the used insert and expose carbide material which is still useful.

Standard insert holders are designed to clamp the cutting insert in one position only for single applications with maximum support under the cutting edge, with little or no possibility of regrinds or readjustment for other applications.

Therefore, it would be desirable to provide a triangular carbide cutting insert holder for re-use of used triangular carbide cutting inserts that can be adjusted for multipurpose machining operations.

SUMMARY OF THE INVENTION

Accordingly, it is a principal object of the present invention to overcome the above-mentioned disadvantages of prior art cutting insert holders, and provide a single point adjustable triangular carbide cutting insert holder for re-use of used triangular carbide cutting inserts as a multipurpose tool. As used herein, "cutting insert" refers to triangular carbide cutting inserts.

It is another object of the present invention to provide a cutting insert holder allowing angular adjustment of the carbide cutting insert without requiring re-adjustment of the whole insert holder in relation to the workpiece being machined, as mounted in the milling machine or lathe.

It is still another object of the present invention to enable use of cutting insert regrinds and to check the lead and relief angles.

It is yet another object of the present invention to provide a cutting insert holder providing adjustable relief and rake angles for re-used cutting inserts.

In accordance with a preferred embodiment of the present invention, there is provided a single point adjustable cutting insert holder comprising:

an elongated member having a shank portion and a base portion, said base portion having formed therein a substantially conically-shaped cavity having a central axis; and jaw assembly means comprising a pair of cone-shaped jaw clamps for retaining therebetween a cutting insert arranged for cutting a workpiece, said jaw clamps being seated in lockably releasable fashion within said conically-shaped cavity so as to be rotatably adjustable therein about said central axis, enabling adjustment of the rake and relief angle of said insert with respect to the workpiece.

In the preferred embodiment, the single point adjustable cutting insert holder is designed to clamp the cutting insert with maximum possibility for regrind or grinding for secondary operations. The insert holder is arranged for use in a milling machine or lathe and is mounted by its shank. The jaw clamps can be removed for placement of the triangular carbide cutting insert between them, and are then re-fitted in the cavity where they are tightened by the locking action of a screw.

As the screw is tightened, the conical jaw clamps are drawn further within the cavity, and are rigidly clamped against the cavity walls by frictional contact. When released, the jaws can be rotated within the cavity, enabling adjustment of the cutting insert rake and relief angle as desired.

The cutting insert is seated between the two jaw clamp halves on a dual-purpose seating and locating cam which is rotatably mounted on an inner face of one of the jaw clamps. The center hole of the cutting insert engages an eccentrically mounted pin extending from the dual-purpose cam, such that rotation of the seating cam locates the insert on the location face machined into the jaw. The dual-purpose cam is mounted at an edge of the inner jaw, such that the exposed portion of the cutting insert is a maximum. Thus, the exposed portion can be reground, allowing for re-use of chipped, burnt and used up triangular carbide cutting inserts.

The ability to re-use used cutting inserts which have been reground makes the inventive insert holder especially attractive for use in many secondary and non-standard machining operations. Thus, "throw away" triangular carbide cutting inserts are reusable, providing economic advantages.

Another advantage of the inventive design is that the jaw assembly allows regulation of the rake and relief angle of the cutting insert by directly adjusting the insert orientation, while maintaining high rigidity of the chosen orientation.

The inventive cutting insert holder can also be used on a lathe, by the addition of a split sleeve on the round shank.

A feature of the invention is the provision of a gauge accessory to check the lead and relief angle of the cutting edge and the angle of the cutting insert, without removing it from the holder, which is especially useful with cutting insert regrinds.

Other features and advantages of the invention will become apparent from the drawings and the description contained hereinbelow.

BRIEF DESCRIPTION OF THE DRAWINGS

For a better understanding of the invention with regard to the preferred embodiments thereof, reference is made to the accompanying drawings, in which like numerals designate corresponding elements or sections throughout, and in which:

FIGS. 9a–d are, respectively, top, front, side and rear views of an alternative embodiment of the jaw assembly, for use in a lathe.

DETAILED DESCRIPTION OF THE PREFERRED EMBODIMENTS

Figure 1:
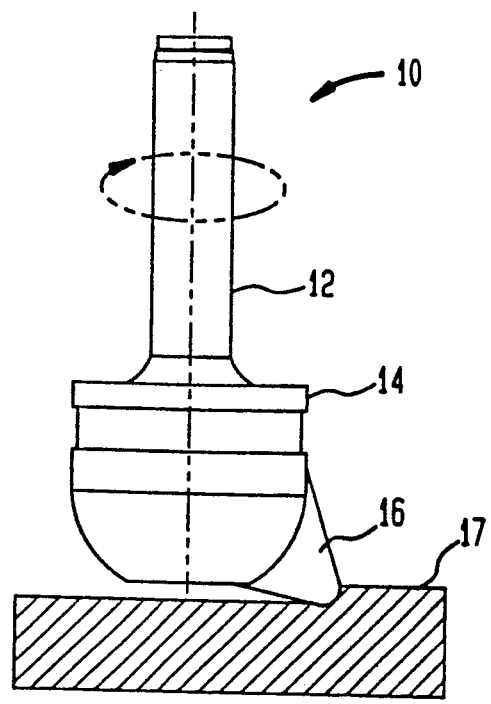
FIG. 1 is a side view of a preferred embodiment of a single point adjustable triangular carbide cutting insert holder constructed and operated in accordance with the invention.

Referring now to FIG. 1, there is shown a side view of a preferred embodiment of a single point adjustable triangular carbide cutting insert holder 10, constructed and operated in accordance with the principles of the present invention. Cutting insert holder 10 comprises a shank portion 12 and a base portion 14. Shank portion 12 is intended for mounting in the collet of a milling machine, and base portion 14 is designed to retain a cutting insert 16 for application to a workpiece 17 in machining operations. The cutting insert 16 is typically a triangular carbide insert (TCI), with a 3/16 in. thickness and a ¼ in. dia. inner circle.

As further described herein, a novel feature of the inventive TCI holder 10 is the arrangement of cutting TCI 16, a maximum portion of which is exposed. This provides TCI holder 10 with the advantage of being able to re-use cutting inserts which have chipped, burnt, or become used up. Such inserts may be reground, without removing them from TCI holder 10, and the regrinds can then be re-used in TCI holder 10. Thus, TCI holder 10 provides economic advantages and savings in set-up time.

Figure 2:
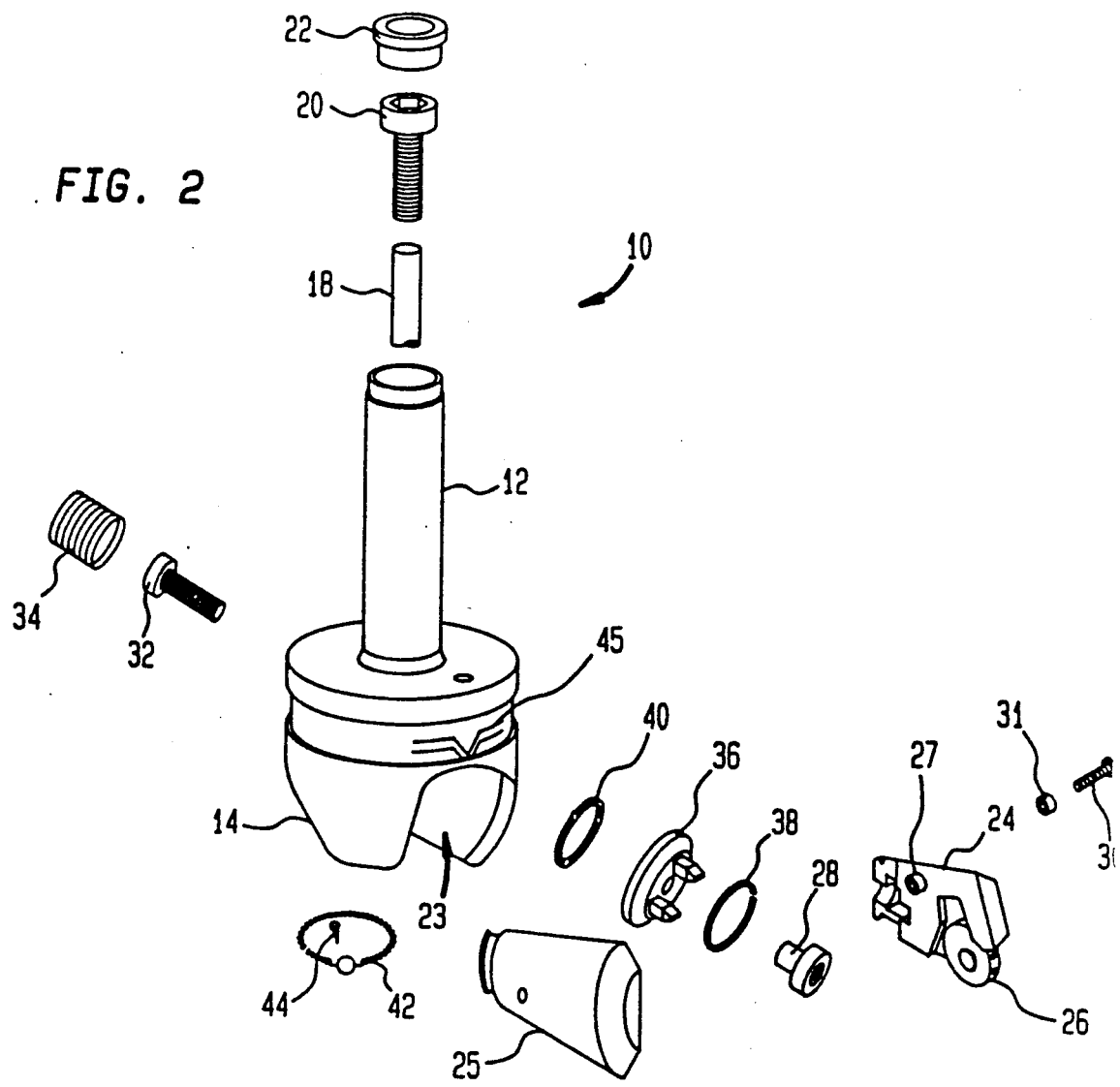
FIG. 2 is an exploded perspective view of the cutting insert holder of FIG. 1.

In FIG. 2, the construction of TCI holder 10 is revealed via an exploded perspective view. The shank portion 12 is provided with a locking pad 18, locking pad screw 20 and shank seal 22 to enable a jaw assembly to be locked in position.

The base portion 14 of TCI holder 10 has a conically-shaped cavity 23 designed to rigidly anchor therein the jaw assembly comprising seating jaw 24 and clamping jaw 25, which clamp TCI 16 in sandwich-like style. As described further herein, a dual-purpose seating and locating cam 26 is mounted in a corner of seating jaw 24, and supports TCI 16 thereon by its central hole. A contra screw 27 balances the load on TCI 16. Jaw assembly 24, 25 is arranged to rigidly clamp TCI 16 by use of a pull nut 28, which is retained in seating jaw 24 by screw 30 in bushing 31.

Pull nut 28 is threaded onto an Allen pull screw 32 inserted at the rear of base portion 14, with screw 32 being seated under screw cover 34. Pull nut 28 is seated between both jaw halves 24 and 25, which in turn are located by locating ring 36. A circlip 38 is placed about the circumference of locating ring 36, which is in turn seated on a thrust washer 40. As pull screw 32 is tightened, pull nut 28 is retracted into cavity 23, causing jaw assembly 24, 25 to be drawn into base portion 14 so that frictional contact is established with the walls of conically-shaped cavity 23 to clamp jaw assembly 24, 25 and firmly lock TCI 16 therein.

A spiral spring 42 is looped about the top of jaw assembly 24, 25 to hold its rear end together, and spring 42 is held in place by retaining screw 44.

To unlock the insert 16, the pull screw 32 is released by turning until its head contacts the pull screw cover 34, so that further turning causes the jaw assembly 24, 25 to slide out of cavity 23, opening it by tension of the spiral spring 42 and providing access to TCI 16. At this point, further turning of screw 32 releases jaw assembly 24, 25 entirely from cavity 23.

In accordance with the principles of the present invention, jaw assembly 24, 25 can be rotated within base portion 14. By releasing pull nut 28, locating ring 36 is free to rotate, and the entire jaw assembly 24, 25 may be rotated before being re-tightened. This enables regulation of the rake and relief angle of the TCI 16 with respect to workpiece 17. As stated before, a used TCI 16 can be re-used in TCI holder 10, and the rotation feature provides maximum versatility. A scale 45 indicating the angle of rotation of TCI 16 may be attached to the base portion 14, for greater precision.

Figure 3A:
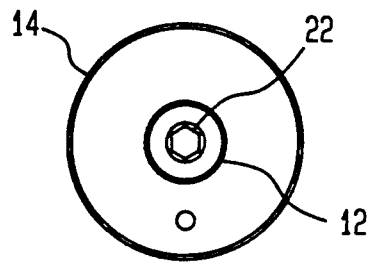
FIGS. 3a–d are, respectively, top, front, rear and bottom views of the cutting insert holder of FIG. 1.
Figure 3C:
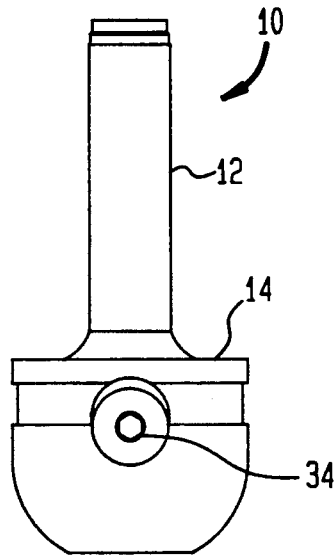
Figure 3B:
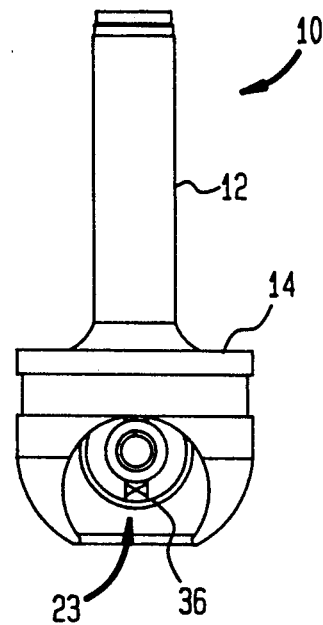
Figure 3D:
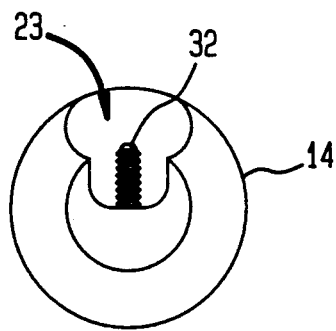

In FIGS. 3a–d there are shown, respectively, top, front, rear and bottom views of the TCI holder 10 of FIG. 1, revealing further construction details. FIG. 3b shows the mounting of the locating ring 36 within cavity 23, which as described above, enables rotation of jaw assembly 24, 25 for the desired rake and relief angle of TCI 16.

The inventive TCI holder 10 can be used for many machining operations, independent of or mounted in a tool holder. When TCI holder 10 is mounted in a tool holder, it is used as a cartridge which is provided with an orientation horizontal to the workpiece. This is particularly useful in such operations as flycutting, stepcutting, downcutting, chamfering, undercutting, light turning, concave or convex radius, etc.

During flycutting operations, the locating ring 36 can either be locked or left unlocked. If unlocked, this can be a desirable safety feature as the whole jaw assembly 24, 25 will rotate under excessive impact rather than cause damage to either the TCI 16, the TCI holder 10 or the workpiece 17.

Figure 4A:
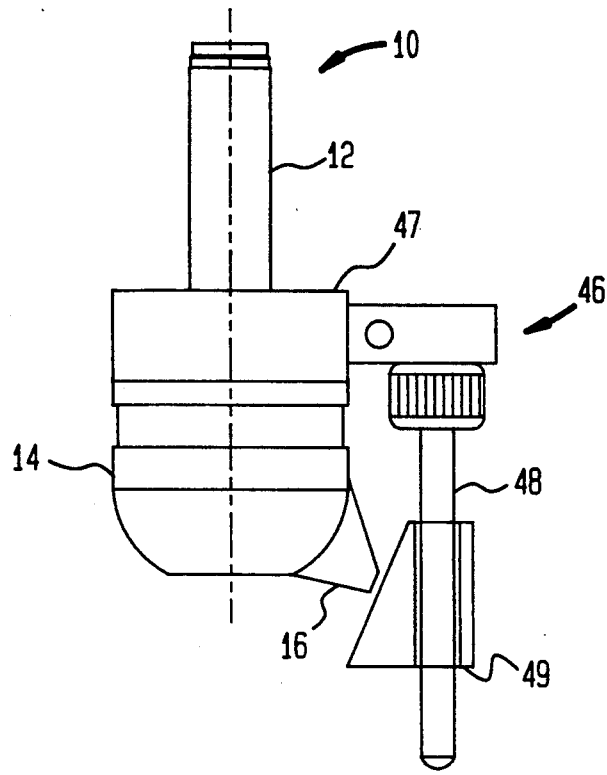
FIGS. 4a–b are, respectively, side and top views of the cutting insert holder with an angle measuring gauge accessory.
Figure 4B:
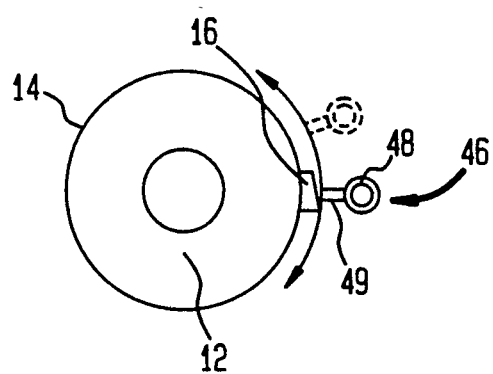

In FIGS. 4a–b there are shown, respectively, side and top views of an angle measuring gauge accessory 46 for use with TCI holder 10. Accessory 46 comprises a seating ring 47, stem 48 and a slidable angle template 49. The design of gauge accessory 46 is particularly advantageous since seating ring 47 can be slid over shank 12 with minimum effort for checking the lead cutting angle (FIG. 4a) or the clearance angle (FIG. 4b) of TCI 16.

Figure 5A:
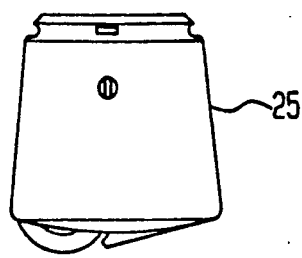
FIGS. 5a–d are, respectively, elevation, left, front and right side views of a jaw assembly used with the insert holder.
Figure 5B:
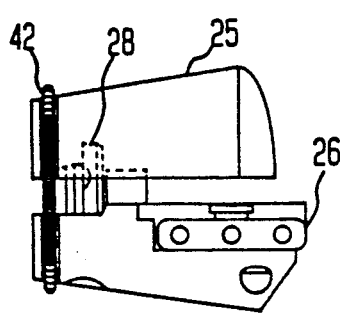
Figure 5C:
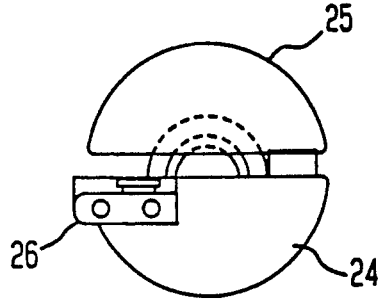
Figure 5D:
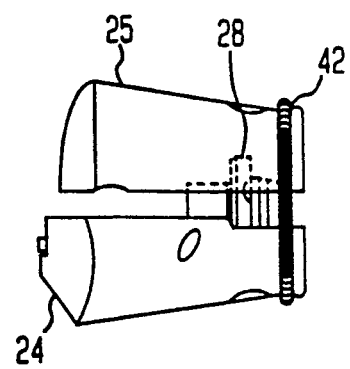
Figure 5E:
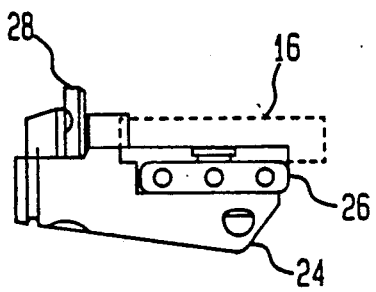
FIGS. 5e–g are, respectively, left, front, and right side views of jaw assembly lower half, with an insert.
Figure 5F:
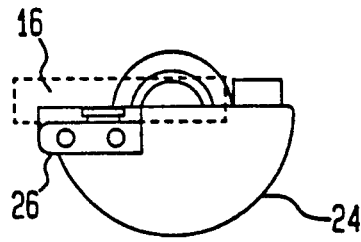
Figure 5G:
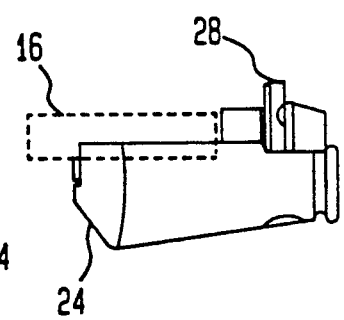

FIGS. 5a–d are, respectively, elevation, left, front and right side views of jaw assembly 24, 25 used with TCI holder 10. FIGS. 5e–g are, respectively, left, front and right side views of seating jaw 24 alone, with a TCI 16 (dotted lines).

Figure 6:
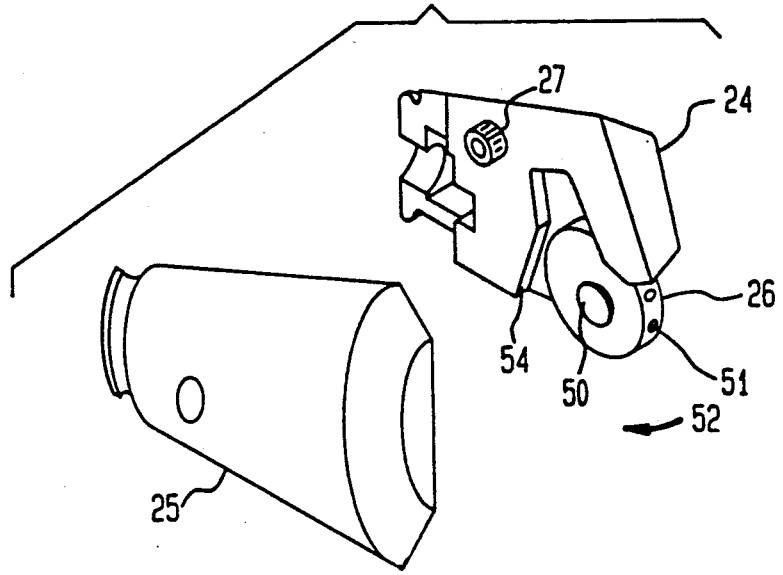
FIG. 6 is an enlarged view of the jaw assembly shown in FIGS. 2 and 5.

In FIG. 6, there is shown an enlarged view of jaw assembly 24, 25. Dual-purpose cam 26 is shown, with an eccentrically mounted pin 50 extending therefrom, which engages the center hole of TCI 16. Dual-purpose cam 26 is rotatably mounted on said seating jaw 24, and can be turned using a key (not shown) which fits in a hole 51.

As described previously, when pull screw 32 is released, jaw assembly 24, 25 slides out of cavity 23, and is opened by tension of the spiral spring 42, providing access to TCI 16. A replacement TCI 16 can then be seated on pin 50, and is firmly located by placing the key in hole 51 and turning in the direction of arrow 52 (clockwise) such that pin 50 moves eccentrically and forces one of the TCI 16 edges against the locating surface 54 of seating jaw 24. Then, the jaw assembly 24, 25 is locked in cavity 23, by re-tightening pull screw 32.

Figure 7A:
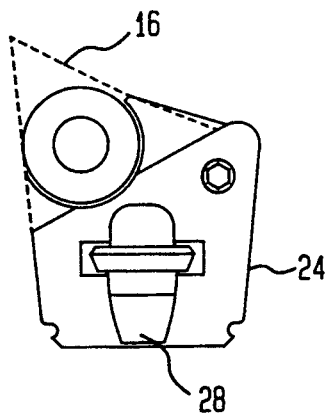
FIGS. 7a–c show three modified lower jaw assemblies, providing different orientations of a cutting insert.
Figure 7B:
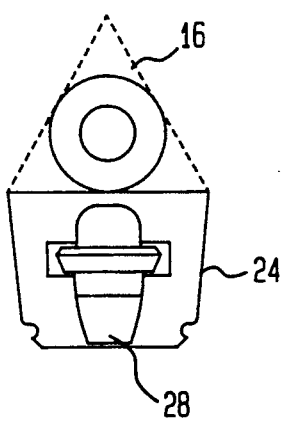
Figure 7C:
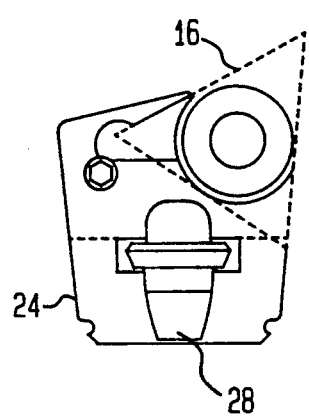
Figure 8A:
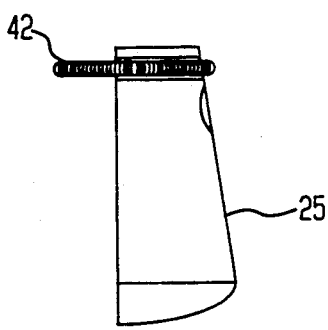
FIGS. 8a–g are assorted views of a single jaw assembly half, and a rear view of a complete jaw assembly.
Figure 8B:
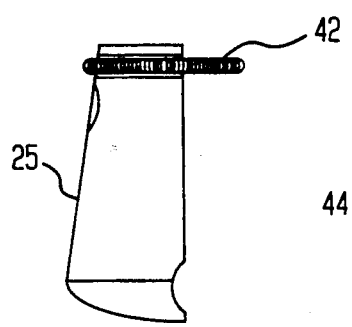
Figure 8C:
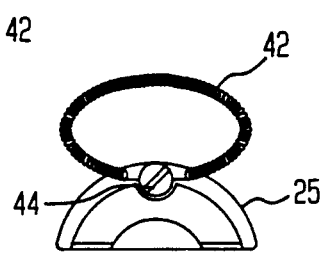
Figure 8D:
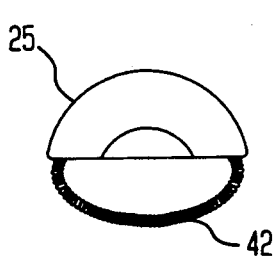
Figure 8E:
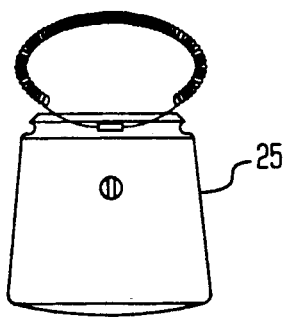
Figure 8F:
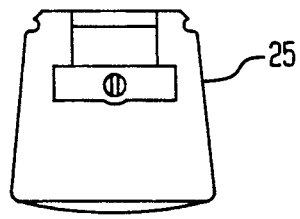
Figure 8G:
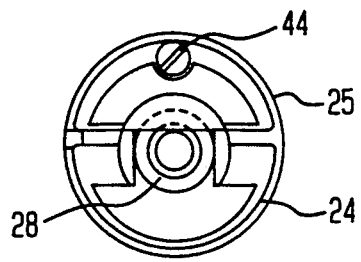

In FIGS. 7a–c, three modified seating jaws 24 are shown, each providing different orientations of TCI 16, by use of different nesting angles. TCI holder 10 can be provided in kit form, with the modified seating jaws 24 available in the kit for particular applications.

FIGS. 8a–g are assorted views of jaw assembly 24, 25 portions, and a rear view of a complete jaw assembly (FIG. 8g), revealing further construction details.

FIGS. 9a–d are, respectively, top, front, side and rear views of an alternative embodiment of TCI holder 10, for use in a lathe. In this arrangement, base portion 14 is replaced by a jaw housing 60, a bottom face 62 of which is designed with radially extending serrations 64 which mesh with a similar pattern formed in a face 66 of the TCI holder shank portion 68. This enables rotation of the jaw housing 60, and within it the jaw assembly 24, 25 for clamping TCI 16, as described previously. As before, the rake and relief angle of TCI 16 are adjustable.

An alternative arrangement for using TCI holder 10 in a lathe is to fit shank 12 in a split sleeve (not shown) which can be locked on its flat sides in a lathe turret or tool post.

Having described the invention with regard to certain specific embodiments thereof, it is to be understood that the description is not meant as a limitation, since further modifications may not suggest themselves to those skilled in the art and it is intended to cover such modifications as fall within the scope of the appended claims.

I claim:

1. A single point adjustable triangular carbide insert (TCI) holder comprising:
    an elongated member having a shank portion and a base portion, said base portion having formed therein a substantially conically-shaped cavity having a central axis; and
    jaw assembly means comprising a pair of cone-shaped jaw clamps for retaining therebetween a TCI arranged for cutting a workpiece, said jaw clamps being seated in lockably releasable fashion within said conically-shaped cavity so as to be rotatably adjustable therein about said central axis, enabling adjustment of the rake and relief angle of said TCI with respect to the workpiece;
    wherein a maximum portion of said TCI is exposed when locked in said jaw clamps.

2. The TCI holder of claim 1 wherein said jaw clamps form halves of a truncated cone which is threaded on a locking screw passing through a wall of said base, said truncated cone being drawn into frictional contact with the walls of said conically-shaped cavity by tightening said screw in said base, so as to rigidly lock said jaws and TCI therein.

3. The TCI holder of claim 1 wherein said TCI is seated on a seating and locating cam which is rotatably mounted on an inner face of one of said jaw clamps, a center hole of said TCI engaging an eccentrically mounted pin extending from said cam, such that rotation of said cam locates an edge of said TCI on said inner jaw face against a locating ridge formed thereon.

4. The TCI holder of claim 1 further comprising an angle measurement gauge comprising a stem extending substantially parallel to said shank portion and being supported from a ring seated on said base portion, said stem having slidably mounted thereon an angle template which, when positioned proximate said insert, provides an indication of the TCI lead and relief angle.

5. The TCI holder of claim 1 wherein said base portion has serrations formed on a face thereof which mesh with serrations formed on said shank portion, allowing rotational adjustment of said base portion when said TCI holder is used in a lathe.

6. The TCI holder of claim 1 further comprising a scale mounted on said base portion for indicating said insert angle.

7. A method of adjusting the rake and relief angle of a cutting insert with respect to a workpiece comprising the steps of:
    providing a single point adjustable triangular carbide insert (TCI) holder comprising an elongated member having a shank portion and a base portion, said base portion having formed therein a substantially conically-shaped cavity having a central axis;
    providing jaw assembly means comprising a pair of jaw clamps for retaining therebetween the TCI arranged for cutting the workpiece, said jaw clamps being seated in lockably releasable fashion within said conically-shaped cavity so as to be rotatably adjustable therein about said central axis; and
    releasing and relocking said jaw assembly means so as to rotatably adjust the rake and relief angle of said TCI with respect to the workpiece;
    wherein a maximum portion of said TCI is exposed when locked in said jaw clamps.

8. The method of claim 7 wherein said TCI is reground without being removed from the holder and is re-used after having been used already, providing economic use and saving set-up time.

9. The method of claim 7 wherein said jaw clamps form halves of a truncated cone which is threaded on a locking screw passing through a wall of said base, said truncated cone being drawn into frictional contact with the walls of said conically-shaped cavity by tightening adjustment of said screw in said base, so as to rigidly lock said jaws and TCI therein.

10. The method of claim 7 wherein said TCI is seated on a seating cam which is rotatably mounted on an inner face of one of said jaw clamps, a central hole of said TCI engaging an eccentrically mounted pin extending from said seating cam, such that rotation of said seating cam locates an edge of said TCI on said inner jaw face against a locating ridge formed thereon.

11. The method of claim 7 further comprising the step of measuring the rake and relief angle of said TCI using an angle measurement gauge comprising a stem extending substantially parallel to said shank portion and being supported from a ring seated on said base portion, said stem having slidably mounted thereon an angle template which, when positioned proximate said insert, provides said rake and relief angle measurement.

12. The method of claim 7 wherein said TCI holder is a cartridge which is held by its shank horizontally to the workpiece in another tool holder arranged for at least one of flycutting, stepcutting, and downcutting operations.

* * * * *